(12) United States Patent
Mishrikey et al.

(10) Patent No.: US 9,916,940 B2
(45) Date of Patent: Mar. 13, 2018

(54) POWER CONTROLLER HAVING ADAPTIVE CONTROL OF A SWITCHING CIRCUIT

(71) Applicant: TYCO ELECTRONICS CORPORATION, Berwyn, PA (US)

(72) Inventors: Matthew D. Mishrikey, Norwood, MA (US); Frank Peter Wahl, III, Ventura, CA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 223 days.

(21) Appl. No.: 14/846,296

(22) Filed: Sep. 4, 2015

(65) Prior Publication Data

US 2017/0069441 A1 Mar. 9, 2017

(51) Int. Cl.
| | | |
|---|---|---|
| *H01H 19/64* | (2006.01) | |
| *H01H 9/54* | (2006.01) | |
| *H02H 9/00* | (2006.01) | |

(52) U.S. Cl.
CPC .............. *H01H 9/54* (2013.01); *H02H 9/001* (2013.01)

(58) Field of Classification Search
None
See application file for complete search history.

(56) References Cited

U.S. PATENT DOCUMENTS

| | | |
|---|---|---|
| 4,494,064 A | 1/1985 | Harkness |
| 5,122,724 A | 6/1992 | Criss |
| 5,202,819 A | 4/1993 | Min |
| 5,374,887 A | 12/1994 | Drobnik |
| 6,654,262 B2 | 11/2003 | Hussein et al. |
| 2006/0152954 A1 | 7/2006 | Jovanovic et al. |
| 2009/0152950 A1 | 6/2009 | Zhang et al. |
| 2012/0256611 A1* | 10/2012 | Fukui ................ B60L 3/003 323/304 |
| 2013/0113430 A1* | 5/2013 | Kim .................. H02J 7/0032 320/134 |

FOREIGN PATENT DOCUMENTS

| | | |
|---|---|---|
| EP | 1 610 355 A1 | 12/2005 |
| EP | 1610355 A1 * | 12/2005 |

OTHER PUBLICATIONS

International Search Report, Application No. PCT/US2016/049242, International Filing Date, Aug. 29, 2016.
Gajjar, Gopal; Kulkarni, A.M.; Soman, S.A.; "Interaction of Capacitor Bank Inrush Current Limiting Reactor and Medium Voltage Vacuum Circuit Breakers"; 7 pgs.

(Continued)

*Primary Examiner* — Long Nguyen

(57) ABSTRACT

Power controller includes a switching circuit that is configured to provide electrical power to a load. The switching circuit includes a first path having a first switch and a second path that is in parallel with the first path prior to the load. The second path includes a second switch. The switching circuit is in a soft-switching state when the second path is activated and the first path is deactivated. The switching circuit is in an operational state when the second path is deactivated and the first path is activated. The power controller includes a processing unit that is configured to open or close the first and second switches to change the switching circuit between the soft-switching state and the operational state.

20 Claims, 6 Drawing Sheets

(56) References Cited

OTHER PUBLICATIONS

Teverovsky, Alexander, "Derating of Surge Currents for Tantalum Capacitors", Dell Services Federal Government, Inc.; NASA/GSFC Greenbelt, MD 20771, USA; 9 pgs.
Imam, Afroz M.; Divan, Deepak M.; Harley, Ronald G.; Habetler, Thomas G.; "Electrolytic Capacitor Failure Mechanism Due to Inrush Current", School of Electrical and Computer Engineering; Georgia Institute of Technology, Atlanta, GA 30332; 7 pgs.
Wu, Jinn-Chang; Jou, Hurng-Liahng; Wu, Kuen-Der; Shen, Nan-Tsun; "Hybrid Switch to Suppress the Inrush Current of AC Power Capacitor", IEEE Transactions on Power Delivery, vol. 20, No. 1, Jan. 2005; 3 pgs.

\* cited by examiner

POWER CONTROLLER HAVING ADAPTIVE CONTROL OF A SWITCHING CIRCUIT

BACKGROUND

The subject matter relates generally to power controllers having at least one of an inrush limiting circuit and/or an inductive kickback limiting circuit.

A power controller (e.g., solid state relay) may be required to operate switches that electrically power a load, such as a capacitive load or an inductive load. The load may appear as a short circuit through a switch when suddenly energized such that a relatively large current flows through the switch. This large amount of current (or inrush current) can potentially damage the switch and/or other circuitry of the power controller. When the load is inductive and suddenly turned off, a large kickback voltage may occur that can damage the switch or possibly other components of the power controller.

To address the inrush current problem, conventional power controllers often include an inrush current limiting circuit. For example, one or more resistors may be placed in series with the load. As another example, the power controller may be configured to have a first path (or branch) that is in parallel with a second path (or branch) prior to the load. Each of the first and second paths includes a respective switch that permits current to flow therethrough. When the power controller is activated (e.g., turned on), the switch of the first path is open and the switch of the second path is closed such that current flows through the second path. The second path functions to pre-charge the load and is typically activated for a predetermined time period after the power controller is activated. The second path is configured to pre-charge the load at a relatively slow rate during the predetermined time period. After the predetermined time period elapses, the second path is automatically deactivated and the first path is automatically activated. The first path may provide a greater performance or allow a higher current than the second path.

The predetermined time period in which the load is pre-charged is based on one or more factors, such as the configuration and application of the power controller. The predetermined time period is a fixed time period, regardless of the state of charge of the load when the power controller is activated.

Although the second paths described above may effectively limit the inrush current, there are some disadvantages to power controllers having them. For example, if the load is already fully charged or partially charged (e.g., from a previous activation), then it is not necessary to activate the second path for the entire time period. Consequently, the time until the first path is activated is delayed. This is generally not desirable, because the first path is more efficient than the second path. Additionally, the second path must be configured to withstand the repeated cycles of activation in which the current flows through the second path for the entire time period. As such, the second path must be larger and/or more costly than circuits that are used less often or that are activated for shorter time periods. In some cases, the second path includes a pulse-rated resistor that is configured for short but high-amplitude pulses of inrush current. This resistor, however, may have a lower dissipation rate than other resistors. If the second path is frequently activated, the second path can experience higher temperatures that may damage the power controller or the switching circuitry.

To address the kickback voltage problem, the switching circuits often include a transient voltage surge suppressor (TVSS) to absorb the large impulse voltage. The TVSS may be, for example, a Zener diode or an metal oxide varistor (MOV). TVSSs have limited lifetimes, however, based on the number and magnitude of the voltage kickbacks and possibly other factors. It may be desirable to reduce the magnitude of the kickback voltage that is absorbed by the TVSSs.

In addition to the above disadvantages, it may also be desirable to monitor the health of the load. For example, the capacitance of a load may decrease during its lifetime operation. If the capacitance falls below a baseline value, it is possible that the load will fail and/or will not achieve the expected performance. Power controllers that are capable of monitoring this load in addition to providing protection from in-rush current may be desirable.

Accordingly, a need exists for a power controller that has an improved inrush limiting circuit. A need also exists for a power controller that reduces the kickback voltage. A need also exists for a power controller that is capable of monitoring the health of the load. Embodiments described herein may address each of these needs or only one or two of these needs.

BRIEF DESCRIPTION

In an embodiment, a power controller is provided that includes a switching circuit configured to provide electrical power to a load. The switching circuit includes a first path having a first switch and a second path that is in parallel with the first path prior to the load. The second path includes a second switch. The switching circuit is in a pre-charging state when the second path is activated and the first path is deactivated. The switching circuit is in an operational state when the second path is deactivated and the first path is activated. The power controller also includes a circuit sensor that is configured to provide signals that are indicative of a state-of-charge (SOC) of the load. The power controller also includes a processing unit that is configured to open or close the first and second switches to change the switching circuit between the pre-charging state and the operational state. The processing unit is configured to determine the SOC of the load based on the signals from the circuit sensor and determine whether to pre-charge the load based on the SOC. The processing unit operates the switching circuit in the operational state when the processing unit determines to not pre-charge the load. The processing unit operates the switching circuit in the pre-charging state for a time period that is based on the SOC when the processing unit determines to pre-charge the load.

In an embodiment, a power controller is provided that includes a switching circuit configured to provide electrical power to a load. The switching circuit includes a first path having a first switch and a second path that is in parallel with the first path prior to the load. The second path includes a second switch. The switching circuit is in a pre-charging state when the second path is activated and the first path is deactivated. The switching circuit is in an operational state when the second path is deactivated and the first path is activated. The power controller also includes a processing unit that is configured to open or close the first and second switches to change the switching circuit between the pre-charging state and the operational state. Upon receiving a command to stop providing electrical power, the processing unit activates the second path while the first path is activated and deactivates the first path after activating the second path. The processing unit opens the second switch of the second path after a time delay to reduce a voltage kickback.

In an embodiment, a power controller is provided that includes a switching circuit configured to provide electrical power to a load. The switching circuit includes a first path having a first switch and a second path that is in parallel with the first path prior to the load. The second path includes a second switch. The switching circuit is in a pre-charging state when the second path is activated and the first path is deactivated. The switching circuit is in an operational state when the second path is deactivated and the first path is activated. The power controller also includes a circuit sensor that is configured to provide signals that are indicative of a capacitance of the load. The power controller also includes a storage medium that is configured to store capacitance values of the load at different points during a lifetime of the load. The power controller also includes a processing unit that is configured to open or close the first and second switches to change the switching circuit between the pre-charging state and the operational state. The processing unit is configured to determine the capacitance values of the load based on the signals from the circuit sensor and store the capacitance values in the storage medium. The processing unit is configured to analyze the capacitance values to determine a health status of the load.

In an embodiment, a non-transitory computer readable medium is provided that includes instructions for controlling operation of a switching circuit to provide electrical power to a load. The instructions may include instructions for operating the switching circuit in a soft-switching manner. For example, the switching circuit may be operated to soft-stop or soft-start a power controller or load.

In an embodiment, a method is provided that includes controlling operation of first and second switches in a switching circuit. The method may include operating the first and second switches in a soft-switching manner. For example, the switching circuit may be operated to soft-stop or soft-start a power controller or load.

BRIEF DESCRIPTION OF THE DRAWINGS

FIG. 4 illustrates a relationship between the load voltage and the temperature of the second switch throughout repeated activations and deactivations of the second path and then repeated activations and deactivations of the first path.

DETAILED DESCRIPTION

Figure 1:
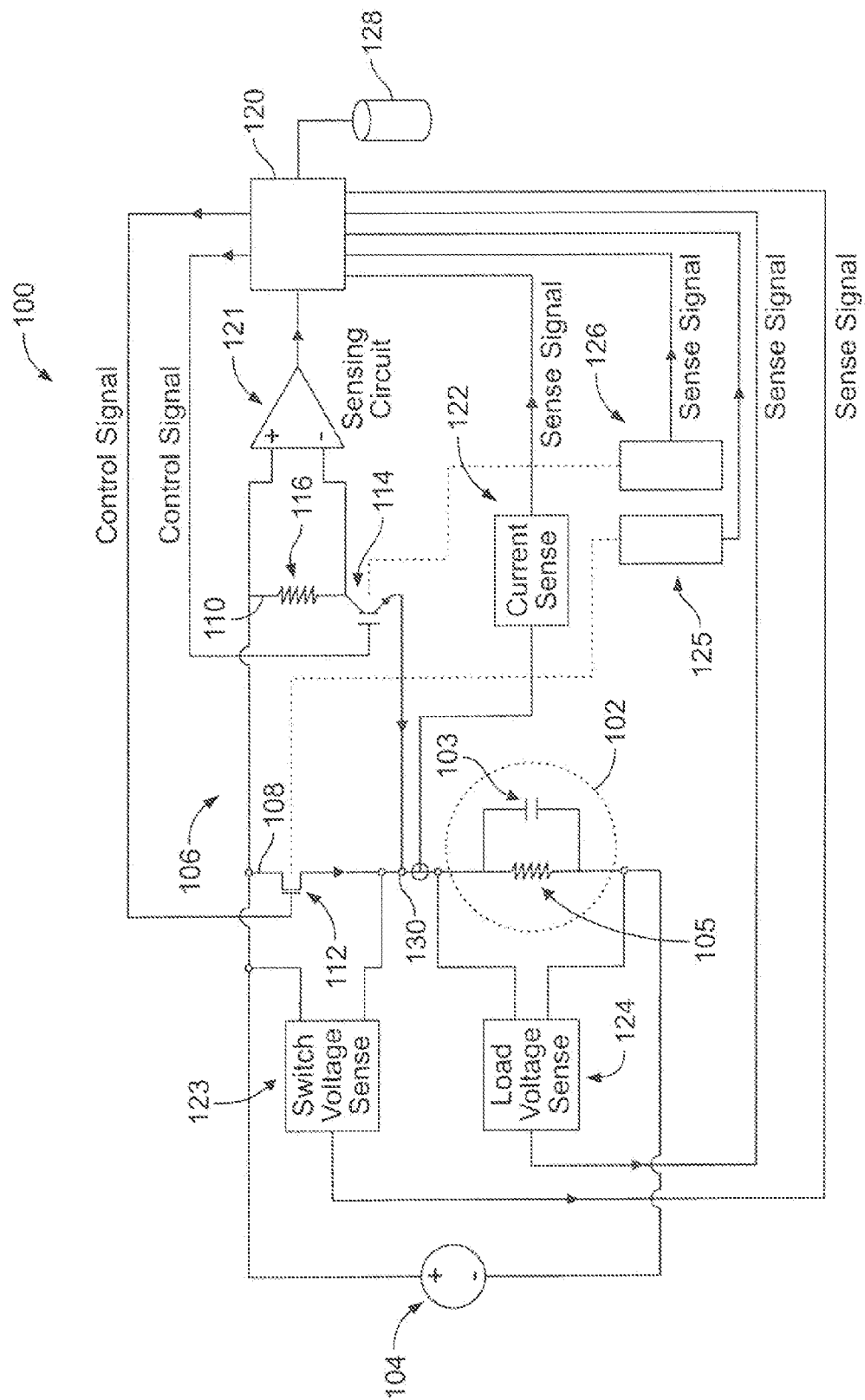
FIG. 1 is a schematic representation of a power controller in accordance with one or more embodiments.

Embodiments set forth herein include electronic circuits that may be capable of adaptively controlling an amount of in-rush current, providing a soft switch, monitoring a health of the load, and/or conditioning or reducing kickback voltage prior to turning OFF. The inrush limiting features may be characterized as "soft-start" features, and the kickback-reducing features may be characterized as "soft-stop" features. It should be understood that the soft-start features and soft-stop features described herein are not mutually exclusive and that embodiments may be configured to perform both soft-start and soft-stop. The electronic circuit may be, for example, a power controller such as a solid state power controller. Embodiments include a switching circuit configured to provide electrical power to a load. During operation, the load may operate as a capacitive load or as an inductive load.

The switching circuit includes a first path having a first switch and a second path that is in parallel with the first path prior to the capacitive load. The second path includes a second switch. The switching circuit is in a pre-charging state when the second path is activated and the first path is deactivated. The switching circuit is in an operational state when the second path is deactivated and the first path is activated. The switching circuit may also be in a soft-stop or kickback-reducing state when the second path is activated and the first path is deactivated. The pre-charging state immediately follows a command or action to turn the switching circuit ON, but the soft-stop state immediately follows a command or action to turn the switching circuit OFF.

Embodiments may make dynamic decisions on whether to activate the second path and, if so, for how long. Unlike conventional power controllers, embodiments set forth herein may monitor data for different parameters of the power controller, analyze the data, and make a decision regarding activation of the first and/or second paths. To this end, embodiments may include a processing unit and one or more circuit sensors that communicate with the processing unit. The circuit sensors may be, for example, voltage sensors, current sensors, temperature sensors, field sensors, internal counters, timers, etc. The circuit sensors communicate data to the processing unit that, in turn, processes the data to determine, for example, a state-of-charge (SOC) of the load or a capacitance of the load.

As used herein, the phrase "determining an [electrical characteristic of interest]" (and like phrases) may include determining a value of the electrical characteristic of interest or determining a value of another characteristic that reliably corresponds to the value of the electrical characteristic of interest. The value of the other characteristic reliably corresponds to the value of the electrical characteristic of interest if operating decisions (e.g., decision whether to activate the second path) may be based on the value of the other characteristic without determining the value of the electrical characteristic of interest. For example, the SOC of a load may reliably correspond to the load voltage such that decisions whether to activate the second path may be based on the value of the load voltage without determining the value of the SOC. In such circumstances, determining the load voltage is effectively the same as determining the SOC with respect to operation of the power controller. As used herein, the term "value" is not necessarily a single numerical value or a numerical range. However, in some embodiments, the term value may represent a single numerical value (e.g., 100 volts) or a numerical range (e.g., 400-500 microfarads).

The dynamic decision-making of one or more embodiments may provide one or more desirable technical effects. For example, a technical effect of one or more embodiments may include at least one of: (a) reducing the time to primary conduction for at least some of the activations of the power controller; (b) reducing the size and/or cost of the switching circuit or power controller; (c) increasing a switching efficiency by reducing dissipation in an in-rush limiting resistor of the switching circuit; (d) optimizing the time period in which the load is pre-charged; (e) or reducing a kickback voltage.

FIG. 1 is a schematic representation of a power controller 100 in accordance with one or more embodiments. In particular embodiments, the power controller 100 is a solid state device. The power controller 100 is configured to control how electrical power is provided to a load 102. The load 102 may be a capacitive load or an inductive load. A load has a complex impedance Z whose imaginary part is the reactance, X. If X is zero, the load is purely resistive. If X is positive, the total reactance is said to be inductive. If X is negative, the total reactance is said to be capacitive. It should be understood, however, that a load may be identified as an "inductive load" or as a "capacitive load" without calculating reactance.

The load 102 may be, for example, a mechanical device (e.g., motor) or optical device (e.g., light bulb). In some embodiments, the load 102 is a device of a larger system, such as an automobile or aircraft. In some cases, the load 102 and/or the power controller 100 may be configured to satisfy established standards for tolerating shock and vibration (e.g., MIL-STD-1344, methods 2004-1 and 2005-1 or similar standards for vibration and shock tolerance). However, it should be understood that the load 102 may be or include any device or system that consumes power. In the illustrated embodiment, the load 102 may have a capacitor 103 and be characterized as having a resistance, which is represented by the resistor 105.

The power controller 100 is electrically coupled to a power source 104 and includes a switching circuit 106. The switching circuit 106 may be capable of operating in a soft-switching state, in which the switching circuit 106 is either soft-starting or soft-stopping, and an operational state. In the illustrated embodiment, the power controller 100 supplies a direct current (DC), but it is contemplated that the power controller 100 may be configured to supply an alternating current (AC) in alternative embodiments. The power source 104 and the switching circuit 106 are in electrical communication with the load 102. The power source 104 may be, for example, a battery or other power supply. The switching circuit 106 is configured to operate in a pre-charging state, in which the load 102 is pre-charged by the power source 104, and in an operational state, in which the load 102 is sufficiently charged.

During the pre-charging state, the SOC increases such that it approaches 100%, although it may not be capable of achieving 100% during the pre-charging state. For example, the SOC may reach at most 85% or 90% during the pre-charging state. Likewise, the load voltage increases during the pre-charging state such that the load voltage approaches the working (or steady state) voltage of the load 102. The operational state may represent the switching circuit 106 during normal operation of the load 102. As described herein, the switching circuit 106 may switch from the pre-charging state to the operational state after the SOC (or the load voltage) has sufficiently increased. In other situations, the power controller 100 may forego implementing the pre-charging state based on the SOC or the load voltage.

In some embodiments, the switching circuit 106 is configured to limit an in-rush current to protect the switching circuit 106 and/or the load 102. To this end, the switching circuit 106 includes first and second paths 108, 110 that are in parallel with each other. The first path 108 includes a first switch 112, and the second path 110 includes a second switch 114. In some embodiments, the first path 108 may be referred to or characterized as a primary drive and the second path 110 may be referred to or characterized as a secondary drive. In such embodiments, the first switch 112 may be referred to as a primary switch and the second switch 114 may be referred to as an in-rush current limiting (ICL) switch. The second path 110 may include a resistor 116 that is in series with the second switch 114. The resistor 116 may be referred to as an in-rush limiting resistor in some embodiments. In the pre-charging state, the first switch 112 is open and the second switch 114 is closed such that current flows through the second path 110 and energizes the load 102. In the operational state, the first switch 112 is closed and the second switch 114 is open such that current flows through the first path 108 and supplies electrical power to the load 102. The first path 108 may provide greater performance, a higher current, and/or lower dissipation than the second path 110.

In other embodiments, the power controller 100 may constitute a soft-switch system for an inductive load. In such embodiments, the power controller 100 may include a similar configuration. For example, the power controller 100, when implemented as a soft-switch system, includes the first and second paths 108, 110 as shown in FIG. 1. To operate in a soft-stop or kickback-reducing state, the second switch 114 is closed while the first switch 112 is closed such that the first and second paths 108, 110 are, momentarily, activated. The first switch 112 may then be opened such that only the second path 110 is activated. At this time, the power controller 100 is in the kickback-reducing state.

The first and second switches 112, 114 may include one or more types of switches (or relays). For example, either of the first and second switches 112, 114 may be or include an insulated-gate bipolar transistor (IGBT), a metal-oxide-semiconductor field-effect transistor (MOSFET), a bipolar junction transistor (BJT), a junction gate field-effect transistor (JFET), a gate turn-off thyristor (GTO), or an MOS-controlled thyristor (MCT). In the illustrated embodiment, the first switch 112 is a MOSFET, and the second switch 114 is an IGBT. However, other types of switches may be used in other embodiments.

The power controller 100 also includes a processing unit 120. The processing unit 120 is operably coupled (e.g., electrically and/or wirelessly coupled) to the first and second switches 112, 114 to open or close the switches 112, 114 as described herein. For example, each of the first and second switches 112, 114 may be operably coupled to the processing unit 120 through a protected gate driver (not shown) that is controlled by the processing unit 120. The power controller 100 also includes a plurality of circuit sensors 121-126 that are configured to communicate with the processing unit 120. The processing unit 120 may receive data, in the form of analog or digital signals, from the circuit sensors 121-126 and use this data (and possibly other data) to determine when to open and close the first and second switches 112, 114.

In various embodiments, the processing unit 120 includes processing circuitry configured to perform one or more tasks, functions, or steps, such as those described herein. For instance, the processing unit 120 may be a logic-based device that performs operations based on instructions stored on a tangible and non-transitory computer readable medium, such as memory. Embodiments may also include computer readable media that includes instructions for controlling operation of the first and second switches as described herein. Embodiments may also include methods for controlling operation of the first and second switches as described herein.

It may be noted that "processing unit," as used herein, is not intended to necessarily be limited to a single processor or single logic-based device. For example, the processing unit 120 may include a single processor (e.g., having one or more cores), multiple discrete processors, one or more application specific integrated circuits (ASICs), and/or one or more field programmable gate arrays (FPGAs). In some embodiments, the processing unit 120 is an off-the-shelf device that is appropriately programmed or instructed to perform operations, such as the algorithms described herein. The processing unit 120 may be, for example, integrated with the switching circuit 106 or separated from the switching circuit 106, but located within the same housing that includes the switching circuit 106. In some embodiments, the processing unit 120 may be mounted to a solid state device (e.g., semiconductor) that includes the switching circuit 106.

The processing unit 120 may also be a hard-wired device (e.g., electronic circuitry) that performs the operations based on hard-wired logic that is configured to perform the algorithms described herein. Accordingly, the processing unit 120 may include one or more ASICs and/or FPGAs. Alternatively or in addition to the above, the processing unit 120 may include or may be associated with a tangible and non-transitory memory having stored thereon instructions configured to direct the processing unit 120 to perform the algorithms described herein.

It is noted that operations performed by the processing unit 120 (e.g., operations corresponding to the methods/algorithms described herein, or aspects thereof) may be sufficiently complex that the operations may not be performed by a human being within a reasonable time period based on the intended application of the power controller 100. For example, a human being could not receive signals from circuit sensors, determine a state-of-charge of a load, and determine whether to control switches for energizing the first path 108 or the second path 110 within milliseconds or a second.

The processing unit 120 is configured to receive signals from one or more of the circuit sensors 121-126. In the illustrated embodiment, the circuit sensors 121-126 are communicatively coupled to the processing unit 120 through conductive pathways or lines. In other embodiments, the processing unit 120 may wirelessly communicate with one or more of the circuit sensors 121-126. The power controller 100 may also include or be communicatively coupled to memory 128. In some embodiments, the memory 128 may include volatile or non-volatile memory. For example, the memory 128 may be or include read-only memory (ROM), random-access memory (RAM), electrically erasable programmable read-only memory (EEPROM), flash memory, and the like. The memory 128 may be configured to store data regarding operating parameters of the power controller 100 or the load 102. For example, the memory 128 may store a working voltage and/or capacitance of the load 102. In FIG. 1, the memory 128 is represented by a single device, but it should be understood that multiple devices may be used.

In some embodiments, based at least on the signals from one or more of the circuit sensors 121-126, the processing unit 120 may determine whether to open or close the first switch 112 and/or the second switch 114. In some embodiments, based at least on the signals, the processing unit 120 may determine a health or operating status of the power controller 100 and/or the load 102. Either of the above determinations may be made in accordance with a corresponding decision-making algorithm, such as the algorithms illustrated in FIGS. 5 and 8. It should be understood that the decision-making algorithms described herein may be utilize signals from only one of the circuit sensors 121-126 or signals from a combination of the circuit sensors 121-126. The decision-making algorithms may also use stored information, such as past load voltages, temperatures, SOCs, capacitances, etc.

In the illustrated embodiment, the circuit sensor 121 is a voltage sensor and is configured to detect a voltage across the resistor 116. The circuit sensor 122 is a current sensor and is configured to detect a current prior to the load 102. The circuit sensor 122 may detect the current after a node 130, which joins the first and second paths 108, 110. The circuit sensor 123 is a voltage sensor that is configured to detect a voltage across the first switch 112. The circuit sensor 124 is a voltage sensor that is configured to detect a voltage across the load 102. The circuit sensor 125 is a temperature sensor that is configured to detect a temperature of the first switch 112. The circuit sensor 126 is a temperature sensor that is configured to detect a temperature of the second switch 114. Non-limiting examples of current sensors include hall effect sensors, current shunts, and current transformers. The circuit sensor 121 may include or be communicatively coupled to a differential amplifier as shown in FIG. 1. Non-limiting examples of voltage sensors include operational amplifiers and differential amplifiers. Non-limiting examples of temperature sensors include thermistors (e.g., negative temperature coefficient (NTC) thermistor), thermocouples, RTD sensors, PTC thermistors, and diodes or other semiconductor temperature sensors.

Figure 2:
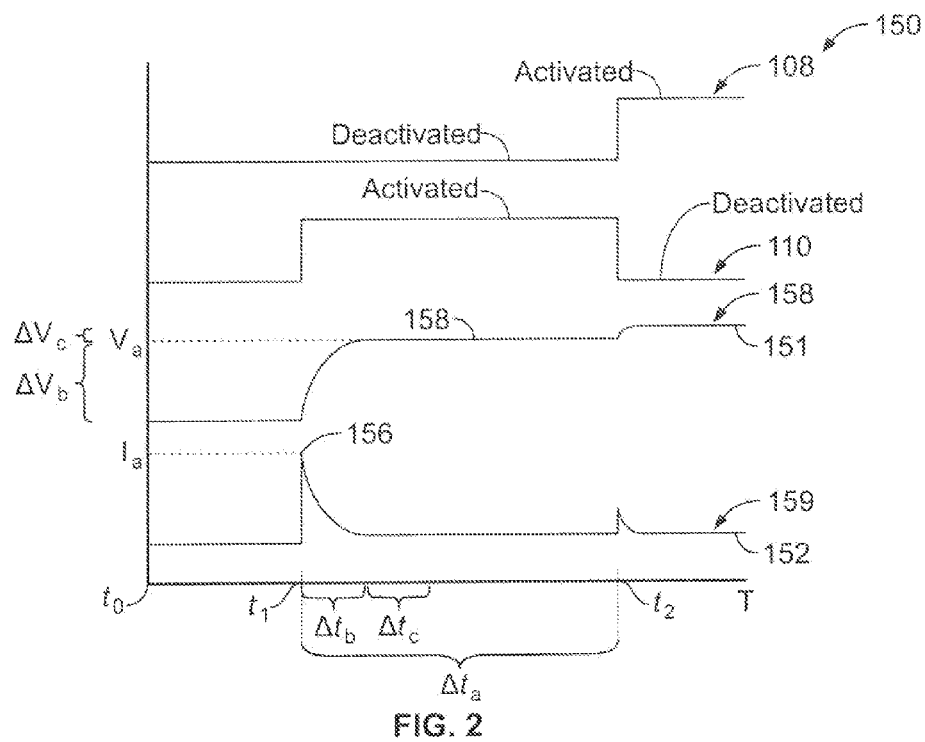
FIG. 2 is a graph illustrating a relationship between a load current, a load voltage, and time during operation of the power controller of FIG. 1 when the load is not charged.
Figure 3:
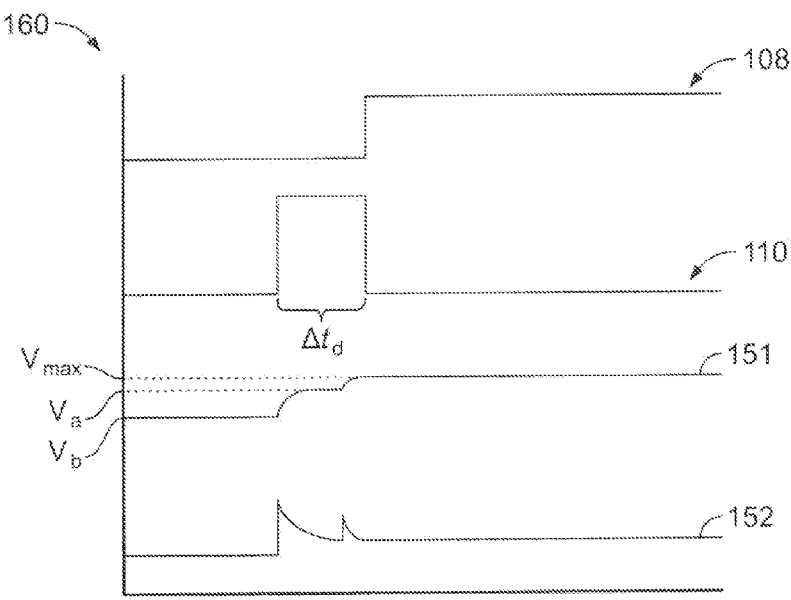
FIG. 3 is a graph illustrating a relationship between the load current, the load voltage, and time during operation of the power controller of FIG. 1 when the load is partially charged.
Figure 4:
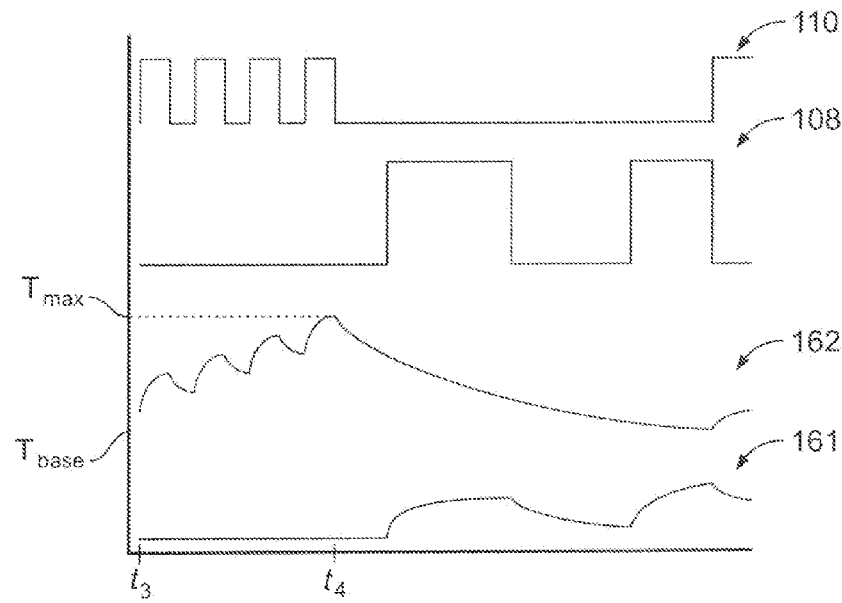
FIG. 4 is a graph illustrating a relationship between the load voltage, a temperature along a path of the power controller, and time during operation of the power controller of FIG. 1. In particular.

The power source 104, the first path 108 through the switching circuit 106, and the load 102 form a first loop of the circuit diagram shown in FIG. 1. The power source 104, the second path 110 through the switching circuit 106, and the load 102 form a second loop of the circuit diagram. During operation, current may flow through either the first loop or the second loop based on the configuration or state of the switching circuit 106. When the power controller 100 is activated, the switching circuit 106 may be in the pre-charging state or the operational state based on determinations or decisions made by the processing unit 120 as described herein. These determinations or decisions may be based on the SOC of the load 102. As described above, the actual SOC may be calculated or a load voltage may be used instead for these decisions. In some embodiments, the processing unit 120 may also determine a health status of the load 102 that may be based, in part, on a capacitance of the load 102. FIGS. 2-4 illustrate in greater detail the data that may be received by the processing unit 120 and how the processing unit 120 may operate in controlling the first and second switches 112, 114.

The SOC and/or the capacitance of the load 102 may be determined by the processing unit 120. In some embodiments, the SOC and/or the capacitance may be calculated by the processing unit 120 based on the signals obtained from one or more of the circuit sensors 121-126. For example, the circuit sensor 124 may communicate signals that are indicative of the voltage across the load 102. As used herein, signals may be "indicative of" an electrical characteristic if the signals directly correspond to values of the electrical characteristic (e.g., volts, amps, etc.) or if the signals may be used to calculate or retrieve values of the electrical characteristic. The circuit sensor 121 may communicate signals that are indicative of the current through the second path 110. Alternatively, the circuit sensor 121 may communicate signals that are indicative of the voltage across the second path 110 (or the resistor 116). In some embodiments, two or more of the above may be used to calculate and/or confirm at least one of the SOC or the capacitance of the load 102.

In some embodiments, the processing unit 120 may utilize stored information in calculating or determining the SOC or the capacitance. The stored information may be stored in the memory 128. The stored information may include values representing electrical characteristics that are provided by the manufacture (e.g., capacitance) or obtained after initial testing of the power controller 100 or the load 102. The stored information may also include values representing electrical characteristics that are determined during the lifetime operation of the load 102. Lifetime operation may include activation of the power controller (e.g., power controller is on to supply electrical power) and deactivation (e.g., power controller is off such that the power controller does not supply electrical power, but testing may be permitted). The stored information may also include relationships (e.g., rates of change) that are provided by the manufacturer or determined during lifetime operation of the load 102. Non-limiting examples of the stored information that may be used by the processing unit 120 include: a starting capacitance of the load 102 (e.g., provided by the manufacturer or determined through testing), values of the capacitance acquired during lifetime operation, an operating voltage of the power source 104, a resistance of the resistor 116, temperature(s) of one or more of the switches, a rate of change in capacitance, a predictive charging rate of the load voltage, and/or a predictive change in temperature of one or more of the switches.

Yet in some embodiments, the SOC or the capacitance may be associated with values in a look-up table. For example, a reading of the load voltage from the circuit sensor 124 may be used to retrieve a SOC value from a look-up table. The look-up table may be stored within the memory 128.

FIG. 2 is a graph 150 that illustrates a relationship between a load voltage (indicated by line 151) and a load current (indicated by line 152) during a single activation of the power controller 100. The X-axis represents time, and the Y-axis represents a change in the load voltage or a change in the load current depending upon the line. For reference, the graph 150 also shows in time whether the first path 108 is activated or the second path 110 is activated. As shown, the second path 110 is activated for a time period $\Delta t_a$ after which the first path 108 is activated.

With respect to the graph 150, the power controller 100 is inactive (or off) from $t_0$ to $t_1$. As such, each of the first and second paths 108, 110 are inactive. At $t_0$, the load voltage is zero and the load current is zero. The SOC of the load is 0%. At $t_1$, the power controller 100 is activated. For example, a user may flip a switch in an automobile or aircraft thereby activating the power controller 100. The power controller 100 may also be automatically activated by the system. Prior to or at the moment of activation of the power controller 100, the processing unit 120 may determine whether the first path 108 or the second path 110 should be activated. For example, prior to activation, the processing unit 120 may test the power controller 100 by sending a pulse through the switching circuit 106 (FIG. 1) and/or receive signals to determine the SOC or the load voltage, which are both referred to as a load characteristic. The test may occur at one or more times after deactivation of the power controller 100. If the processing unit 120 determines that the load characteristic (e.g., SOC or load voltage) does not satisfy a predetermined condition (e.g., whether the SOC or the load voltage is above a percentage or certain value, respectively), then the processing unit 120 will control the switching circuit 106 to operate in the pre-charging state such that the second path 110 is energized. If the processing unit 120 determines that the load characteristic does satisfy the predetermined condition (e.g., the SOC or the load voltage is above a percentage or certain value, respectively), then the processing unit 120 will control the switching circuit 106 to operate in the operational state such that the first path 108 is energized.

In FIG. 2, the processing unit 120 has determined that the load voltage is below a reference value $V_a$ and activated the second path 110 at $t_1$. The first path 108 is not active at $t_1$. As such, the in-rush current reaches a large value, $I_a$ (e.g., 750 A), but the value is less than the value that might be obtained through the first path 108. The current slows returns to a steady state level 160.

Although the above example of decision-making occurs prior to activation of the power controller 100, it is contemplated that, in some embodiments, the decision-making may begin at the moment of activation (e.g., the moment that the switch is flipped) or at some time immediately after activation. For example, the power controller 100 may provide the processing unit 120 with a designated amount of lead time (e.g., microseconds) to begin determining whether to activate the first path 108 or the second path 110 before allowing current to flow therethrough. In other embodiments, the power controller 100 may allow current to flow therethrough only after the processing unit 120 has determined whether to energize the first path 108 or the second path 110. In some embodiments, the power controller 100 may automatically energize the first path 108 after activation and then determine whether to change states of the switching circuit 106. In some embodiments, the power controller 100 may automatically energize the second path 110 after activation and then determine whether to change states of the switching circuit 106. As described herein, the above determinations may be made by the processing unit 120.

When the processing unit 120 determines to activate the second path 110, the processing unit 120 may also determine a duration of time ($\Delta t_A$) at which the load 102 will be pre-charged. For example, the processing unit 120 may determine the time period $\Delta t_a$ by monitoring signals from one or more of the circuit sensors 121-126. More specifically, the processing unit 120 may analyze the signals from one or more of the circuit sensors 121-126 to determine a designated load characteristic. For example, when the SOC or the load voltage exceeds the reference value, then the processing unit 120 may deactivate the second path 110 and activate the first path 108. Accordingly, in some embodiments, the time period $\Delta t_a$ is not determined prior to activation of the second path 110. Instead, the time period $\Delta t_a$ is determined by monitoring the second path 110 to identify when a certain condition is satisfied.

In other embodiments, the processing unit 120 may determine the time period $\Delta t_a$ by predicting how long it will take to pre-charge the load 102. For example, the memory 128 may store an algorithm or equation that represents a rate at which the SOC (or the load voltage) will change. Using this algorithm and the present SOC (or the present load voltage), the processing unit 120 may predict when the SOC (or the load voltage) will exceed the corresponding reference value. The time period $\Delta t_a$ may be based on this calculated time period. After the time period $\Delta t_a$ elapses, the switching circuit 106 may change states.

In other embodiments, the processing unit 120 may determine the time period $\Delta t_a$ by retrieving a value from a database, such as a look-up table. For example, if the processing unit 120 determines that the present SOC or the present load voltage is below the corresponding reference value, the processing unit 120 may communicate with the look-up table and retrieve a time period $\Delta t_a$ that is associated with the present SOC or the present load voltage. As a specific example, if the present load voltage is 0% of the reference voltage, then the look-up table may provide a time period $\Delta t_a$ that is sufficient to pre-charge the load 102 such that the load 102 has a sufficient SOC or load voltage when the switching circuit 106 changes to the operational state. In some embodiments, the time period $\Delta t_a$ in the look-up table may be based on instructions provided by a user or by a manufacturer. In some embodiments, the time period $\Delta t_a$ in the look-up table may be calculated by analysis of the SOCs or the load voltages during previous activations in which the load 102 was pre-charged.

As shown in FIG. 2, the second path 110 is activated at $t_1$. An inrush of the load current 152 spikes at 156. However, the spike 156 is within operating parameters of the switching circuit 106 and/or the power controller 100 such that the switching circuit 106 and/or the power controller 100 do not fail. During the time period $\Delta t_a$, the load 102 pre-charges. The second path 110 is configured to pre-charge the capacitive load at a relatively slow rate (e.g., relative to the first path 108) between $t_1$ and $t_2$.

As shown, the load voltage 151 increases toward an operating level 158 and the load current decreases toward a steady state current 159. The operating level 158 may be the maximum voltage that is obtainable using the second path 110. In some embodiments, the reference value $V_a$ that is compared to the present SOC or the present load voltage may be based on a maximum voltage, such as the rating voltage of the power source 104 or the load 102. In some embodiments, the reference value $V_a$ may be 50% or more of the maximum voltage that is possible. In particular embodiments, the reference voltage $V_a$ may be 60% or more of the maximum voltage or 70% or more of the maximum voltage. In more particular embodiments, the reference value $V_a$ may be 80% or more of the maximum voltage or 90% or more of the maximum voltage. The reference value $V_a$ may be based on the configuration of the switching circuit 106, the robustness of the switching circuit 106, and/or the application of the power controller 100 or the load 102.

At $t_2$, the second path 110 is deactivated and the first path 108 is activated. With the load 102 partially charged at $t_2$, the inrush current through the first path 108 and/or the power controller 100 will be less than without the second path 110.

In some embodiments, the time $t_2$ and, consequently, the time period $\Delta t_a$ is based on a rate of change of the SOC or the load voltage. As shown in FIG. 2, the rate of change in the load voltage diminishes as the load voltage approaches the maximum voltage. For instance, time periods $\Delta t_b$ and $\Delta t_c$ represent the same durations in time. However, the change in load voltage through the time period $\Delta t_b$ (referenced as $\Delta V_b$) is significantly greater than the change in load voltage through the time period $\Delta t_c$ (referenced as $\Delta V_c$). In some embodiments, it may be more desirable to be at primary conduction more quickly than to have the load voltage closer to the maximum voltage. As such, the time period $\Delta t$ may be optimized by reducing the reference value $V_a$ so that primary conduction may occur sooner. For example, in some embodiments, the time period $\Delta t$ may be optimized to decrease the temperature experienced by the switching circuit 106 or, more specifically, the resistor 116. In addition, it may be desirable to operate at primary conduction sooner based on (1) information that indicates that the second path is compromised, (2) instructions that the load requires a shorter time period $\Delta t$, and/or (3) information that the first path can sustain a shorter time period $\Delta t$ without substantial wear or damage. In some cases, the time period $\Delta t$ may be based on predicted future cycles. For example, the time period $\Delta t$ may be based on how much stress the load will cause the second path in a future cycle or cycles. In such embodiments, the time period $\Delta t$ may be configured to minimize the stress on the second path so that the second path may sustain the stress during future cycle(s).

FIG. 3 is a graph 160 that illustrates a relationship between the load voltage 151 and the load current 152 during a single activation of the power controller 100. FIG. 3 is similar to FIG. 2, however, the load 102 has no charge in FIG. 2, but is partially charged in FIG. 3. Unlike conventional power controllers that may activate a second path for a set time period, regardless of the SOC, embodiments may reduce the time period $\Delta t$ at which the second path 110 pre-charges the load 102. For example, the load voltage 151 prior to activation in FIG. 3 (indicated as $V_b$) may be 70% of the maximum voltage $V_{max}$ prior to activation.

As described above, the processing unit 102 may determine the SOC or the load voltage and, based upon this load characteristic, determine whether to activate the first path 108 or the second path 110. These determinations may be made prior to or when the power controller 100 is activated. If the load characteristic is less than a reference value, the processing unit 102 determines to activate the second path 110. The processing unit 120 also determines how long to pre-charge the load 102. More specifically, the processing unit 102 may determine a time period $\Delta t_d$ at which the second path 110 will be activated and the first path 108 deactivated. In FIG. 3, the time period $\Delta t_d$ is shorter than the time period $\Delta t_a$ (FIG. 2) because the load 102 is partially charged.

Accordingly, various benefits may be obtained by the dynamic decision-making of one or more embodiments. Because the time period $\Delta t$ is variable and may be reduced based upon a load characteristic, the time to primary conduction (e.g., activation of the first path 108) for at least some of the activations of the power controller 100 can be reduced. Because the second path 110 will be used less frequently and, at times, for shorter durations, the size and/or cost of the switching circuit 106 or the power controller 100 may be reduced. Moreover, heat generated by the resistor 116 may be reduced thereby increasing efficiency of the switching circuit 106. Alternatively or in addition to the above, the time period $\Delta t$ may be optimized to provide a more desirable performance of the power controller 100.

FIG. 4 illustrates a series of activations and deactivations of the second path 110 prior to activations/deactivations of the first path 108. For some situations, the reference value for the load characteristic will remain static such that the first path 108 will be activated only after the designated condition has been satisfied. However, in other embodiments, the reference value may be modified by the processing unit 120 to adjust performance. In addition, the decision of when to activate the first path 108 may be influenced by factors other than the designated load characteristic. For example, in some embodiments, the processing unit 120 may decide to deactivate the second path 110 and activate the first path 108 if the temperature of the second path 110 and/or the resistor 116 exceeds a designated temperature.

The X-axis in FIG. 4 indicates time, and the Y-axis indicates, depending upon the relevant element, temperature of the first switch 112 (indicated by 161), temperature of the second switch 114 (indicted by 162), or activation/deactivation of the first or second paths 108, 110. More specifically, FIG. 4 illustrates the temperature 161 of the first switch 112 and the temperature 162 of the second switch 114 throughout repeated activations and deactivations of the second path 110 and then repeated activations and deactivations of the first path 108. As shown, the second switch 114 (FIG. 1) is repeatedly closed and open from $t_3$ to $t_4$. When the second path 110 is activated for each cycle, current flowing through the second path 110 may cause an increase in temperature 162. When the second path 110 is deactivated, however, heat may dissipate causing the temperature 162 to decrease. At this time, if the first path 108 is activated, the temperature 161 will increase. As such, the first path 108 may be used to allow the temperature 162 to decrease. In some cases, the first path 108 may be configured to sustain a greater increase in temperature than the second path 110.

In some embodiments, the processing unit 120 may receive signals from the circuit sensor 126 that are indicative of the operating temperature 162 along the second path 110. In some configurations, it may be known that the second path 110 (e.g., the second switch 114 and/or another circuit element associated with the second path 110) may be likely to fail or be damaged if the temperature 162 exceeds a designated threshold value. This designated threshold value is indicated as $T_{max}$ in FIG. 4. In such embodiments, the processing unit 120 may analyze the temperature 162 along the second path 110. The processing unit 120 may determine to adjust operation of the power controller 100 if the temperature 162 exceeds (or will exceed) the threshold value $T_{max}$. For example, in FIG. 4, the processing unit 120 has determined after the second path 110 is deactivated (or while the second path 110 is activated) that the temperature has exceeded the reference value $T_{max}$. In such embodiments, the processing unit 120 may activate the first path 108 instead of the second path 110. More specifically, although user inputs or an automated protocol may request activation of the second path 110, the processing unit 120 may override this command and activate the first path 108. As shown in FIG. 4, the first path 108 is repeatedly activated and deactivated. The first path 108 may be activated/deactivated in order to achieve the same objective of activating/deactivating of the second path 110.

In such embodiments, the first path 108 may take over the function of the second path 110 for a period of time. For example, the processing unit 120 may repeatedly activate and deactivate the first path 108 in order to permit the heat to dissipate and, consequently, allow the temperature along the second path 110 to decrease. In FIG. 4, the processing unit 120 has determined at $t_5$ that the temperature has decreased to a designated baseline value $T_{base}$. At this value, the second path 108 may be activated and deactivated as before. Accordingly, in some embodiments, the processing unit 120 may optimize activation/deactivation of the first and second paths 108, 110 so that a desired performance is achieved without risking damage or failure of the switching circuit 106.

Figure 5:
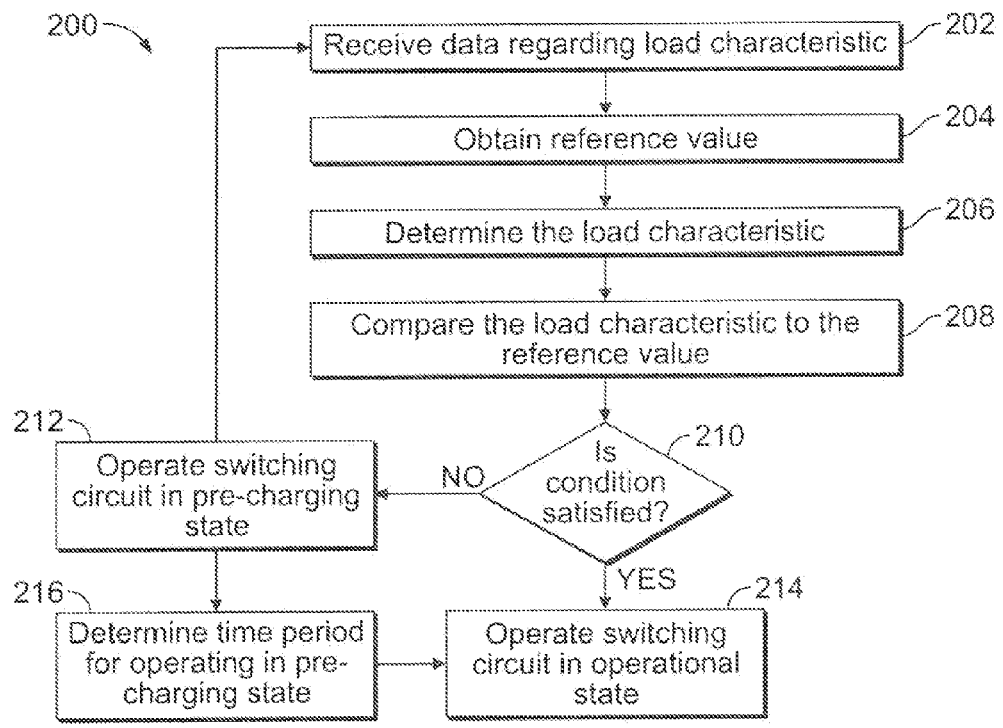
FIG. 5 is a flowchart illustrating a method or algorithm for determining whether and when to activate a second path of a power controller.

FIG. 5 illustrates a flowchart of a decision-making algorithm or algorithm 200 that may be performed in one or more embodiments. The algorithm 200 may be used to, for example, decide whether to change switching circuitry in the power controller 100 to primary conduction based on data obtained about the load 102. The algorithm 200 may be implemented, at least in part, by the processing unit 120. The algorithm 200 may begin upon activation of the power controller 100, such as the flip of switch by user. In other embodiments, however, at least a portion of the algorithm 200 may be executed prior to activation of the power controller 100. For example, when the power controller 100 is installed and coupled to the load 102, the algorithm 200 may be executed while the power controller 100 is deactivated and in a sleep or inoperative state. For instance, during this time, the processing unit 120 may periodically execute a pulse to test the operating parameters (e.g., electrical characteristics) of the power controller 102, such as the load voltage, load current, and temperatures of different elements. The testing may occur, for example, such as once every second, once every ten seconds, once every minute, etc.

At 202, data that is indicative of a load characteristic of the power controller 100 may be received. For example, the data may be signals that are indicative of the SOC and/or the load voltage of the load 102. The data may be received from one or more of the circuit sensors 121-126. Optionally, data may also be received from the storage medium 128. At 204, a reference value for comparing to the load characteristic is obtained. It should be understood that obtaining, at 204, the reference value may occur prior to receiving, at 202, the data of the load characteristic or after determining, at 206, a load characteristic. In some embodiments, the reference value may be a fixed value established prior to execution of the algorithm such that the operation of obtaining the reference value, at 204, has already been performed. In other embodiments, however, the reference value may be determined at 204, such as by calculating the reference value or retrieving the reference value from a database. For example, the reference value may be based on present conditions of the power controller, such as a temperature of the switching circuit 106.

At 206, a designated load characteristic may be determined. For example, the SOC or the load voltage may be determined based on the data received at 202. As described herein, the load characteristic may be determined by calculating the load characteristic using the data received from one or more of the circuit sensors 121-126 or by retrieving the load characteristic from a database, such as a look-up table, in the storage medium 128. In some embodiments, the determination, at 206, occurs upon receiving the data at 202. More specifically, the signals received at 202 may be compared directly to the reference value without further modification. The data received from the circuit sensor 124 may represent the load voltage.

At 208, the load characteristic may be compared to the reference value obtained at 204. At 210, a query may whether the load characteristic satisfies a predetermined condition. For example, the load characteristic may be compared to the reference value to determine whether the load characteristic exceeds the reference value. If the load characteristic does not exceed the reference value, then the switching circuit 106, at 212, either maintains the switching circuit 106 in the pre-charging state or operates the first and second switches 112, 114 so that the switching circuit 106 is in the pre-charging state. More specifically, if the switching circuit 106 is in the operational state at 212, then the algorithm 200 may include closing the second switch 114 and opening the first switch 112, which may also be referred to as activating the second path 110 and deactivating the first path 108, respectively. If the switching circuit 106 is in the pre-charging state at 212, then algorithm 200 may include maintaining the switching circuit 106 in the pre-charging state. When the switching circuit 106 is in the pre-charging state, the load 102 is pre-charged such that the SOC increases.

The algorithm 200 may return to the operation 202 and repeat operations 202, 204, 206, 208 and the query at 210. As such, the algorithm 200 may include monitoring the load characteristic until the load characteristic satisfies the pre-determined condition. In some embodiments, after obtaining the reference value at 206, this operation may not be repeated. For example, when monitoring the load characteristic, the algorithm 200 may only include repeating operations 202, 206, and 208 and the query at 210 until the load characteristic satisfies the predetermined condition.

If the load characteristic satisfies the predetermined condition (e.g., exceeds the reference value), then the algorithm 200 controls the switching circuit 106 to either maintain the operational state or switch from the pre-charging state to the operational state. For example, in some situations, the SOC may be 0% or at an insufficient charge level at 208. In such situations, the switching circuit 106 may be in the pre-charging state until the load 102 is sufficiently charged. After determining that the load 102 is sufficiently charged, at 210, then the algorithm 200 may include opening the second switch 114 and closing the first switch 112, which may also be referred to as deactivating the second path 110 and activating the first path 108. In other embodiments, the load 102 may be sufficiently charged when the power controller 100 is activated. In such situations, the algorithm 200 commands, at 214, the switching circuit 106 to operate in the operational state.

In some embodiments, the algorithm 200 may include determining, at 216, a time period at which the load 102 will be pre-charged through the second path. For example, the algorithm 200 may include calculating the time period, at 216, based on present conditions, such as the present SOC, the present load voltage, etc. As one specific example, the rate of change of the load voltage for the load 102 may be known and, for example, stored in the storage medium 128. Using the known rate of change and the present load voltage and, optionally, other data, the time period can be calculated. In some embodiments, the time period may be retrieved from a database based upon the present load voltage. In such embodiments, the algorithm 200 may not repeat operations 202, 204, 206, 208, and the query at 210. Instead, the algorithm 200 may allow the power controller 100 to pre-charge the load 102 for the determined time period. After the time period has elapsed, the switching circuit 106 may switch from the pre-charging state to the operational state at 214.

In some embodiments, the operation at 204 may include determining a reference value. As described herein, the reference value may be modified (e.g., increased or decreased) based on conditions of the power controller 100. As one example, the reference value may be decreased if the temperature of the second switch 114 or the resistor 116 has exceeded or will exceed a designated temperature. In such embodiments, the first path 108 may be activated sooner to stop current flow through the second path 110 and allow thermal energy to dissipate from the resistor 116.

Accordingly, the reference value may be a variable value that based on one or more present conditions of power controller 100. For example, the reference value may be based on at least one of a present temperature along the second path 110, a designated threshold temperature, a difference between the present and threshold temperatures, and an expected temperature increase with a subsequent activation. The designated threshold temperature may represent a temperature in which, if exceeded, the switching circuit 106 may be damaged or fail. The designated threshold temperature may be, for example, provided by a manufacturer, inputted by a user of the power controller 100, or calculated by the processing unit 120 during lifetime usage of the power controller 100. Likewise, the expected temperature increase with a subsequent activation may be, for example, provided by a manufacturer or calculated by the processing unit 120 during lifetime usage of the power controller 100.

The algorithm 200 may repeat after the power controller 100 is turned off. For example, the algorithm 200 may execute periodic test pulses to determine the SOC, load voltage, temperature, etc. prior to subsequent activation of the power controller 100. In some embodiments, the algorithm 200 may include establishing conditions for operating the switching circuit 106 while the power controller 100 is deactivated. For example, the algorithm 200 may decide that, if the power controller 100 is activated within the next 500 milliseconds (or other predetermined time period), the switching circuit 106 will operate in the operational state, but if the power controller 100 is activated after the next 500 milliseconds (or other predetermined time period), then the switching circuit 106 will operate in the pre-charging state. In some embodiments, the algorithm 200 may also determine the time period at which the switching circuit 106 will be in the pre-charging state. For example, the algorithm 200 may determine that if the power controller 100 is activated prior to the end of the predetermined time period at X time, then the time period for the pre-charging state will be Y.

The following describes one test of a power controller have a similar setup as the power controller 100 of FIG. 1. It should be understood that this is just one example and that modifications may be made to the circuit diagram in FIG. 1 without departing from the scope of the subject matter set forth herein. The following was implemented with a source voltage of 230 V and a current of 100 Amps. The load had a working capacitance of 470 μF and a resistance of 2.5 ohm. The in-rush resistor was 0.5 ohm. The test included providing a 1000 μsec pulse from the power source, wherein the second path was turned on for the first 500 μsec, at which time the second path was turned off, and the first path was turned on for the next 500 μsec.

Because the 0.5 ohm resistor is in series with the 2.5 ohm load, the two circuit elements form a resistor divider for the capacitor of the load. Thus, it is expected that the $V_{final}$ of the capacitor to reach about 2.5/(0.5+2.5) or approximately 5/6 of $V_{source}$ after the first 500 μsec. This is about 190 V of the 230 V of the power source. During the test, it was detected that the $V_{final}$ of the capacitor was 180 V. Accordingly, the first 500 μsec was capable of providing about 95% of the possible charge that could be provided by the second path (i.e., the pre-charging path). Additional charge time may help reduce the follow-on inrush current when the first path is turned on, but additional time would offer diminishing improvement. In this example, 100 μsec additional time would allow the second path to charge the capacitor to about 190 V. It should be noted that the load capacitance (470 uF) could also be determined from the shape of the detected charge/discharge cycles.

When the power controller is turned off, the load voltage may experience a step down (i.e., an abrupt decrease in load voltage). This decrease is based on the equivalent series resistance (ESR) of the load capacitor. In this case, the load capacitor is sourcing the approximately 100 A when the power controller is turned off. The abrupt decrease in load voltage is due to the voltage drop across the ESR of the load capacitor.

In this case, the ESR may be calculated as $\Delta V/I_{load}$ at this moment, which was 15V/90 A or about 170 milliohms in the test example. In this test, the hook up wires added about 100 milliohms so the capacitor ESR contribution is about 70 milliohms. The capacitor's datasheet states the ESR is about 45 milliohms. If the power controller and the load are properly calibrated prior to operation, one may be able to identify whether the ESR of the capacitor increases over time.

The contribution of the ESR of the capacitor was also present at the end of the pre-charge cycle. In this test, the current was 120 A at 500 μsec. Because the load operates at 90 A, it can be calculated that the capacitor has 30 A flowing through at 500 μsec. As such, it can be assumed that the capacitor is charged a little less than the 180V, which in this example was about 175 V. This calculation may improve estimation of one or more of the load characteristics.

When the first path was turned on and the second path turned off, a second inrush of current occurred. This extra capacitor pulse current is due to $\Delta V_{SOC}/(ESR_{source}+R_{first\ path}+ESR_{load})$, which in this example is about 235 A. The actual current inrush measured was about 200 A. Because the resistance of the first path is a relatively low contributor to the above measurements, it is believed that with calibration to initial source/load parameters under known conditions the system should have sufficient ability to detect appreciable load impedance shifts over time.

Figure 6:
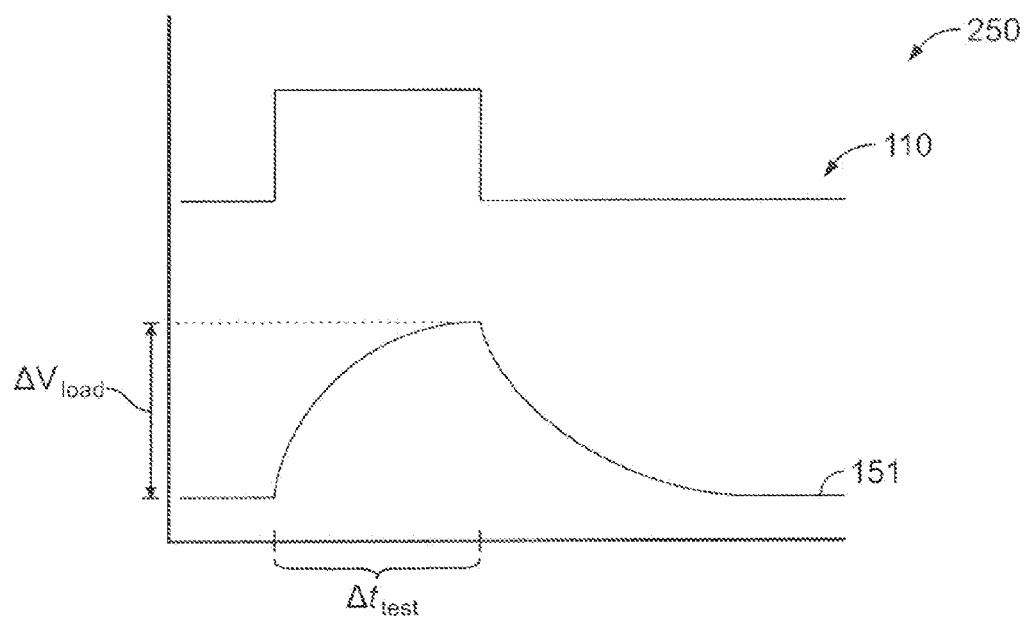
FIG. 6 is a graph illustrating a relationship between the load voltage and time during operation of the power controller of FIG. 1.

FIG. 6 is a graph 250 illustrating a relationship between the load voltage 151 and time during operation of the power controller 100. In some embodiments, the power controller 100 may monitor a health status of the load 102. For example, the power controller 100 may be configured to monitor a capacitance of the load 102 to determine whether the load 102 is failing or whether its performance is decreasing. FIG. 6 shows the load voltage 151. In some embodiments, the power controller 100 may initiate a test pulse of the second path 110 for a predetermined time period (indicated as $\Delta t_{test}$). The pre-charge resistance is known and may be stored within the storage medium 128. As such, the load voltage 151 may be monitored for the predetermined time period $\Delta t_{test}$. After determining a change in the load voltage ($\Delta V_{load}$), the processing unit 120 may determine a rate of change of the load voltage for the predetermined time period $\Delta t_{test}$. With this information, the processing unit 120 may determine the capacitance of the load 102. The capacitance of the load 102 may then be stored within the storage medium 128.

Figure 7:
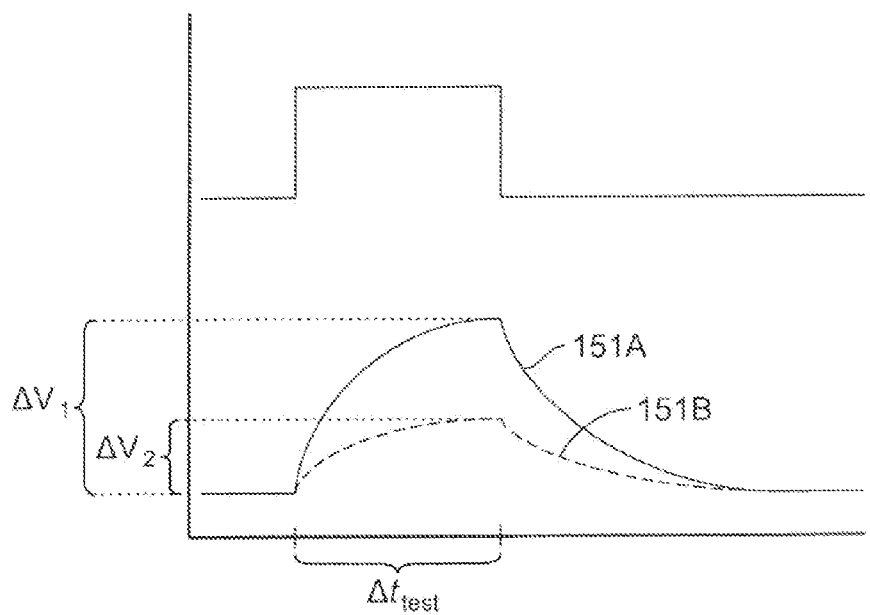
FIG. 7 is a graph illustrating a relationship between the load voltage and time during operation of the power controller of FIG. 1 when the load has first and second states of health.

FIG. 7 is a graph illustrating a relationship between the load voltage 151 and time when the load 102 has first and second capacitive states. Throughout operation of the load 102 and the power controller 100, the capacitance at different points in time may be stored within the storage medium 128. As the load 102 is used and/or ages, the capacitance may decrease. As shown in FIG. 7, the load voltage 151 may have a first amount of change ($\Delta V_1$) at a first point in time (referenced as 151A) (e.g., immediately after installation of the power controller 100) when the pulse is provided for the time period $\Delta t_{test}$. The load voltage 151 may have a second amount of change ($\Delta V_2$) at a subsequent second point in time (referenced as 151B) when the pulse is provided for the time period $\Delta t_{test}$. As shown, the change in voltage is significantly different between the different points in time.

Accordingly, the processing unit 120 may be configured to monitor the health of the load 102 by analyzing a change in capacitance over the lifetime operation of the load 102. In some embodiments, the processing unit 120 may generate an alert that informs a user that the load 102 is failing or that its performance is decreasing. For example, the processing unit 120 may analyze the capacitances stored throughout the lifetime operation of the load 102 and, based on these data points, predict when the load 102 may fail (or otherwise fall to a predetermined performance). The analysis may include predicting when the capacitance will fall below a reference value. The reference value may be provided by a manufacturer, a user of the load 102, or may be calculated by the processing unit 120 during the lifetime operation of the load 102.

Figure 8:
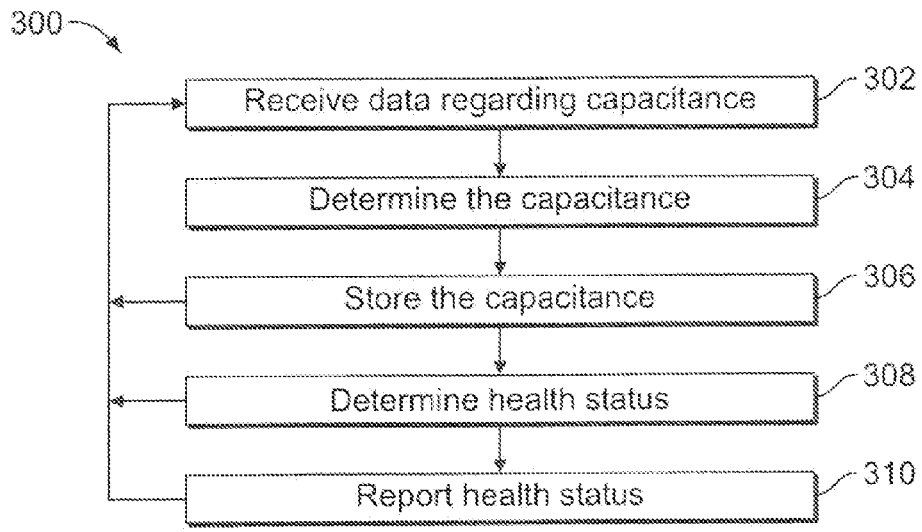
FIG. 8 is a flowchart illustrating a method or algorithm for monitoring a health of the load.

FIG. 8 illustrates a flowchart of a decision-making algorithm 300 for monitoring a health of the load in accordance with one or more embodiments. The algorithm 300 may be used to, for example, decide whether to generate an alert and/or cause the power controller to cease providing power to the load 102. The algorithm 300 may be implemented, at least in part, by the processing unit 120. In some embodiments, the algorithm 300 may also be implemented concurrently with the algorithm 200.

The algorithm 300 may begin upon activation of the power controller 100, such as the flip of switch by user. In other embodiments, however, the algorithm 300 begins prior to activation of the power controller 100. For example, when the power controller 100 is deactivated and in a sleep or inoperative state, the processing unit 120 may periodically execute a pulse to test the capacitance of the power controller 100. The testing may occur, for example, such as once every second, once every ten seconds, once every minute, etc. In other embodiments, the testing occurs after each time the power controller 100 is deactivated.

At 302, data is received that is indicative of the capacitance of the load 102. More specifically, data is received that may be used for calculating a capacitance of the load 102. For example, the data may represent or be used to determine the load voltage. At 304, the capacitance (or load voltage) may be determined and the capacitance (or load voltage) may be stored at 306. The value may be stored within a storage medium 128. At 308, a health status may be determined that is based on the capacitance of the load 102. The health status may be indicative of the health or performance of the load 102. The determination, at 308, may occur each time the capacitance (or load voltage) is determined at 304 or each time the capacitance (or load voltage) is stored at 306. In other embodiments, however, the determination at 308 occurs less frequently. In some embodiments, the health status may be stored within the storage medium 128.

The determination, at 308, may include comparing the present capacitance value with a working capacitance of the load 102. The working capacitance of the load 102 may be the capacitance of the load 102 prior to use. More specifically, the working capacitance may represent the highest capacitance of the load 102, such as when the load 102 is initially installed or operated.

Optionally, at 310, the algorithm 300 may include reporting the health status of the load 102. In some embodiments, reporting, at 300, the health status includes generating a report. For example, the report may be a data file that is properly formatted for a system or user to review. The data may include what fraction (or percentage) of the working capacitance that the load 102 currently has. Alternatively or in addition to, the report may include a prediction as to when the load 102 may fail or underperform. For example, the report may indicate one or more of the following: (a) a time frame in which the load 102 has an X % chance of failing (e.g., 90% chance of failing within 10 days from now; 80% chance of failing between 7-10 days from now); (b) a chance of failure within or after a designated number of activations (e.g., 70% chance of failing after 5 more activations; 50% chance of failing within the next 3 activations); or (c) a time frame in which the load 102 will begin performing at X % of desired capacity (e.g., load will begin performing at 50% capacity within 10 days; load will not be performing at capacity in 7 days).

Figure 9:
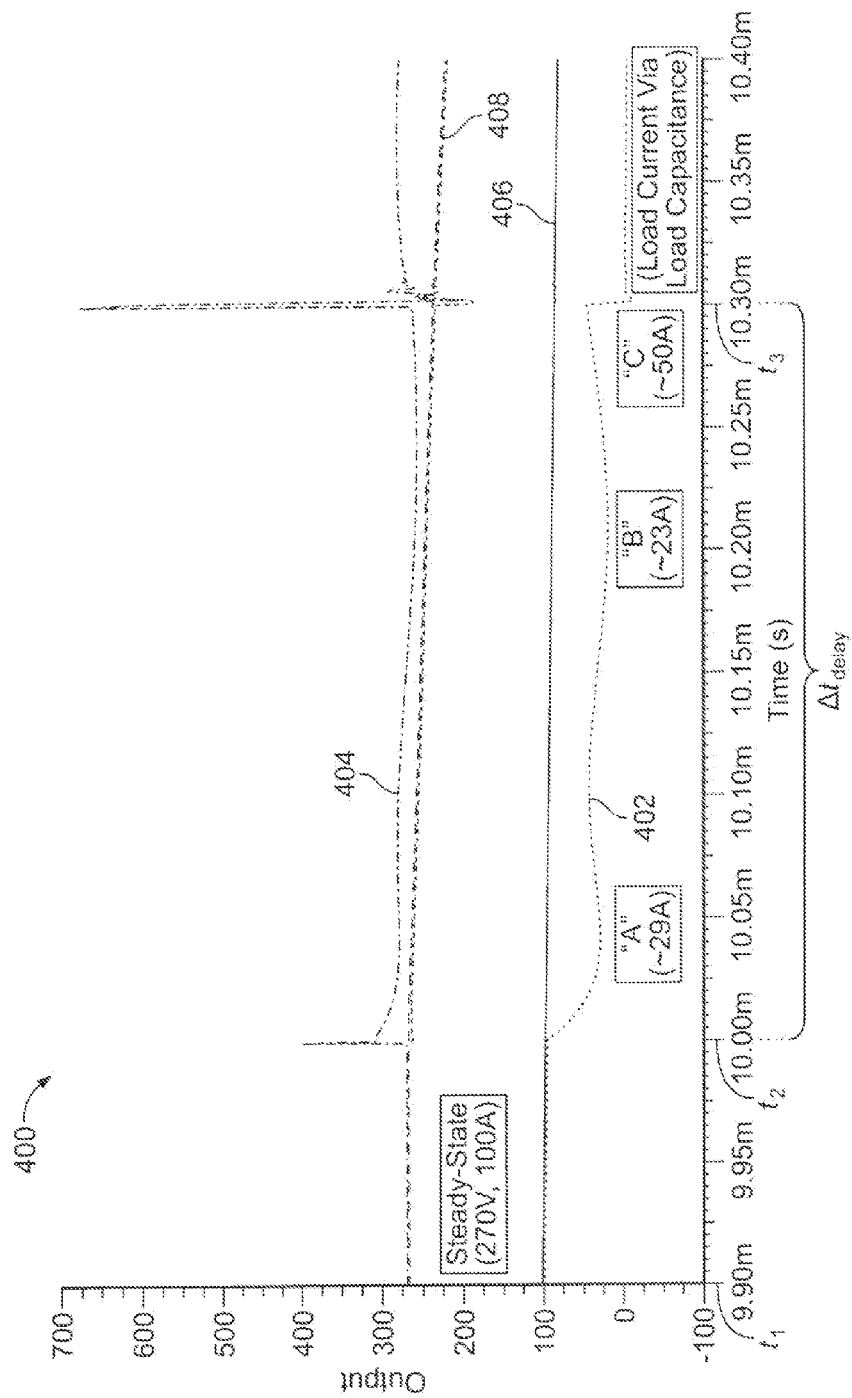
FIG. 9 is a graph illustrating a soft-stop process using the power controller of FIG. 1.

FIG. 9 is a graph 400 illustrating electrical characteristics during a soft-stop process of a power controller, such as the power controller 100 (FIG. 1). As described above, embodiments may also be configured to reduce a kickback voltage (or impulse voltage) that may occur when the load is inductive and a switch is opened. More specifically, when a relatively large amount of current flows through the switching circuit 106 and a relatively large amount of inductive energy exists, then a kickback voltage may occur that can damage the switching circuit 106 when the switching circuit 106 is turned OFF.

For a predetermined set of parasitics and a current level in the circuit, there will be an optimal time (or time range) to turn the switch off (or de-energize the switching circuit) in order to minimize the resulting inductive kickback. A "hard turn OFF" occurs when the switch is opened without any soft-stop features (e.g., diode or the soft-stop process described herein). By slowly/softly turning off, the kickback voltage due to source impedance can be diminished. Embodiments set forth herein enable dynamically adjusting the timing of the switching circuit so that the kickback voltage is reduced when the last switch is opened. This may protect the power controller and other elements from damage and allow for components to have a lesser rating than the components of a device that is not capable of this feature. By reducing the kickback voltage, it may also be possible to reduce the size of the component and/or improve the robustness of the component. For example, it may be possible to use a smaller or less expensive diode.

Embodiments may be particularly suited for when the source impedance has a significant inductive component. For example, the source inductance may be significant when the power controller input, at 270 Vdc nominal, has an unclamped voltage transient that is greater than 700 Vpk for more than 3 usec when a nominal 100 A load is abruptly removed during a hard turn OFF. When the source is inductive and the wiring resistance is very low, which is typical for power distribution, the switching behavior may become underdamped or "ringy." Because an instantaneous voltage drop across a switch is equal to the inductance multiplied by the rate of change of the instantaneous current, the voltage will "ring-up" when the inductor field collapses as source current falls.

The soft-stop features described herein may reduce the ring up of the voltage by slowing the rate of current decay. Embodiments may momentarily insert added resistance from the second path 110 during the soft-stop. The resistance may be added by a resistor in the second path 110, such as the resistor 116. By allowing the second path 110 to be activated momentarily (e.g, about 5-400 microseconds), the energy in the source inductance is allowed to dissipate into the resistor 116 (FIG. 1). This may also add resistive damping to the transient response shape. The second path 110 is configured to handle large pulses during pre-charge and, as such, the second path 110 may be configured to sustain the multiple turn-offs during lifetime operation of the power controller 100. In other embodiments, resistance may be effectively added by the second switch 114 with or without the resistor 116. For example, the second switch 114 may operate in a lossy fashion.

Embodiments may be configured to open the second switch 114 at a time delay $\Delta t_{delay}$ after the first switch 112 is opened. For example, the time delay $\Delta t_{delay}$ may be based on when the source current (or the stored inductive energy) is at a local minimum. As one particular example, the first opportunity for an underdamped system may be at the first local minimum of the current undershoot after the initial main switch turn-off.

The time delay $\Delta t_{delay}$ for opening the second switch 114 may be constrained by one or more factors including: (1) practical pulse-power and energy limitations of the resistor 116; (2) maximum allowable turn-off time determined by specification for the power controller; (3) maximum allowable turn-off time determined by specification for the system or load; (4) the last local minimum of the current. If a last local minimum does not exist (e.g., the current continues to decrease), the time delay may be determined by (1), (2) and/or (3) above or by a point at which any additional delay provides minimal return. This may be determined by the system, the power controller, or the user. Non-limiting examples of upper limits for the time delay may be 50 microseconds, 75 microseconds, 100 microseconds, 150 microseconds, 200 microseconds, 250 microseconds, 300 microseconds, 400 microseconds, or 500 microseconds.

In addition to the time delay, the power controller 100 (e.g., the processing unit 120) and/or the system that includes the power controller 100 may determine when to close the second switch 114, open the first switch 112, and then open the second switch 114. These determinations may be based on instructions from the manufacturer of the power controller or the larger system that includes the power controller or based on instructions from the user of the power controller or the system. The determination may be based on historical data relating to the usage of the power controller or the system. The time delay $\Delta t_{delay}$ may be a value or values stored into the power controller 100 or the system.

It should be understood that the time delay $\Delta t_{delay}$ may be determined based on one or more factors. For example, a system designer or manufacturer can characterize a transient load behavior via simulation, empirical data, or trial-and-error to determine the time delay $\Delta t_{delay}$ based on conditions or certain electrical characteristics of the power controller. The time delay (or time delays for a variety of situations) may be stored into a memory (e.g., setup register) of the system, a memory of the power controller, or hardwired directly into the power controller. As another example, the power controller or the system that includes the power controller may perform an auto-tune sequence to identify relevant source/load parameters for determining the time delay or time delays. The auto-tune sequence may be executed at a predetermined time by the system or by the power controller.

In addition to the above, the power controller may use predetermined criteria, such as when the load is operating below a designated threshold or percent nominal. The power controller may also identify a minimum time delay from previous events and determine the time delay based on these events. The power controller may identify a minimum time delay dynamically, such as identifying a local minimum (e.g., calculate when derivative of current is zero). The power controller may receive instructions from the system that designate the time delay or a time delay range. As one example, the instructions may indicate that the time delay must be between 50-100 microseconds. The time delay may then be the local minimum that is within this range.

The instructions may be communicated prior to use of the power controller or may be communicated periodically throughout lifetime operation. In this case, the system may adaptively compute the time delay based on information provided by the power controller and information that is not available to the power controller. In some cases, the soft-off feature may be disabled based on criteria programmed into the power controller, based on criteria developed by the power controller during usage, or based on criteria communicated by the system.

The time delay may be based on a predetermined condition or conditions and also based on data that is received in real-time. For example, the power controller may receive instructions or be programmed to open the second switch when the current operates below a baseline value. The baseline value may be a function of, for example, information provided from the manufacturer, historical data, etc. The baseline value may be based on where local minima are suspected to occur. For example, if the first local minimum is suspected to be about 25% of the steady state current, then the baseline value may be set at 30% of the steady state current. The power controller may then receive signals from a circuit sensor that indicate the source current. When the source current falls below the baseline value, the power controller may open the second switch. Although embodiments have been described as monitoring the source current, the load current may also be monitored and be used to dynamically control soft-stopping operation.

Additional conditions may be applied, such as those described above. For example, the power controller may open the second switch only after a designated time period (e.g., 50 microseconds) and only after the source current (or load current) falls below the baseline value. If the current never falls below the baseline value, the second switch may be automatically opened at a designated time period (e.g., 200 microseconds).

FIG. 9 shows source current at 402, a source voltage at 404, a load current at 406, a load voltage at 408. From $t_1$ to $t_2$ in FIG. 9, the power controller is fully ON and operates at a steady-state voltage of 270V and current of 100 A. It should be understood, however, that embodiments may operate at different steady-state voltages and different steady-state currents. At $t_2$, the first switch is opened in response to a command for turning the electrical power OFF. The command to stop the electrical power may be made manually (e.g., individual moving a switch) or may be communicated from a system controller. At $t_3$, the second switch is opened. The time delay Δt from $t_2$ to $t_3$ is configured to reduce the kickback voltage. The time delay Δt in FIG. 9 is 300 microseconds and is extended to point C in order to illustrate electrical characteristics of the electrical circuit. In some embodiments, the time delay Δt ends at about point A or at about point B. Because the kickback voltage is equal to ½ L $i^2$, the kickback voltage would be significantly reduced at point A or point B in the example illustrated in FIG. 9. In other embodiments, however, the time delay Δt may be determined by additional factors and, as such, may be any time prior to point C and, in other possible embodiments, after point C.

In some embodiments, the time delay is less than or equal to the last local minimum. In some embodiments, the time delay is less than or equal to about 20% more than the last local minimum. In some embodiments, the time delay is within +/−30% of a local minimum. For example, if the time delay at a local minimum is 30 microseconds, then the time delay may be between 21 and 39 microseconds. In particular embodiments, the time delay is within +/−20% of a local minimum, within +/−10% of a local minimum, or +/−5% of a local minimum. These local minimums may be the first local minimum, the second local minimum, the third local minimum, et seq. In some embodiments, the time delay is within a certain time period from a local minimum, such as within 20 microseconds or 10 microseconds of the local minimum. In some embodiments, the time delay is within 300 microseconds, 200 microseconds, 100 microseconds or, more specifically, within 50 microseconds.

Figure 10:
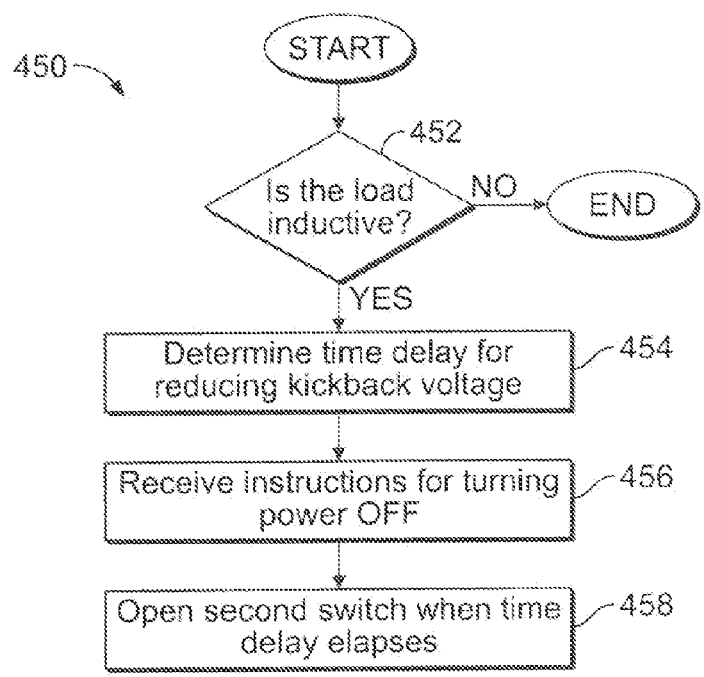
FIG. 10 is a flowchart illustrating a method of reducing kickback voltage prior to turning OFF.

FIG. 10 is a flowchart illustrating a method 450 for determining when to open the second switch in order to reduce a kickback voltage. At 452, the method 450 includes determining whether the load is an inductive load. In many situations, one may not know whether the load that is fed power through the power controller is an inductive load, capacitive load, or purely resistive load. For example, the power controller may feed power to a sub-panel that controls a plurality of loads. In such cases, the overall load controlled by the power controller may be different depending upon the status of each of the loads.

One or more processes may be used to identify the type of load that the power controller is providing electrical power to. For example, the method 450 may include determining a rate of change of the load voltage or a rate of change of the load current during start-up. If the rate of change is slow, the load may be assigned or designated as an inductive load. As another example, a phase difference between the load current and the load voltage may be detected to determine if one is lagging or leading the other, which may be indicative of an inductive load or a capacitive load. In other embodiments, however, the determination at 452 may include receiving instructions from the system that designate the load as an inductive load.

In other embodiments, the determination at 452 may be based on statuses of multiple loads that the power controller supplies electrical power to. The status for each load may indicate, for example, whether the load is ON or OFF. Optionally, the status for each load, if ON, may also indicate a current operating state (e.g., flap is partially up or flap is fully up). The determination at 452 may be based on a combination of the statuses of the loads. As an example, the determination at 452 may be a capacitive load if one or more predetermined combinations of the statuses exists or may be an inductive load if one or more other predetermined combinations of the statuses exists. As one example, assuming the circuit supplies electrical power to Loads 1-6. If Load 1, Load 3, and Load 4 are ON, but Load 2, Load 5, and Load 6 are OFF, the determination at 452 may be that the overall load is capacitive. If Load 1, Load 2, and Load 3 are ON, but Load 4, Load 5, and Load 6 are OFF, the determination at 452 may be that the overall load is inductive.

Yet in other embodiments, the determination at 452 may include monitoring other electrical characteristics to determine whether the load is an inductive load. These electrical characteristics (e.g., current, voltage) may be monitored during operation. It should be understood that the different examples provided herein for determining, at 452, whether the load is inductive or capacitive may be used with each other. For example, the determination at 452 may be based on (1) a rate of change of the load voltage or a rate of change of the load current during start-up; (2) monitoring electrical characteristics during operation; and (3) statuses of the different loads.

If the load is an inductive load, the method 450 proceeds. If the load is a capacitive load or a purely resistive load, the method 450 ends and the first path may be opened immediately. In some cases, if the load is determined to be a capacitive load, embodiments may then operate in accordance with the soft-start features described above.

At 454, a time delay for reducing the kickback voltage may be determined. As described above, the time delay may be based on one or more factors that are calculated by the power controller or the system or that are stored within the power controller or the system. The determination at 454 is configured to reduce the kickback voltage such that the kickback voltage is substantially less than the kickback voltage during a hard turn OFF. The kickback voltage may be substantially less if, for example, the kickback voltage is reduced 50% or more compared to the kickback voltage during a hard turn OFF. In some embodiments, the kickback voltage may be reduced by at least 75% or, in more particular embodiments, the kickback voltage may be reduced by at least 90%. Transient energy is equal to ½ L i². Thus, the transient energy reduces significantly as the current reduces.

In particular embodiments, the time delay is based on when the load current is at a local minimum, such as point A or point B in FIG. 9. For example, the time delay may be at a local minimum or within 20% of a local minimum. In some embodiments, the determination at 454 may be based on a local minimum and other factors or information, such as those described above. In other embodiments, the determination at 454 is not based on a local minimum but only other factors or information, such as those described above The determination at 454 may be made prior to the power controller being turned ON (i.e., conducting power), prior to the power controller receiving a command to be turned OFF, or after the power controller receives a command for turning OFF. At 456, the power controller receives the command for being turned OFF at the end of the time delay Δt and, at 458, opens the second switch.

In an embodiment, a power controller is provided that includes a switching circuit configured to provide electrical power to a load. The switching circuit includes a first path having a first switch and a second path that is in parallel with the first path prior to the load. The second path includes a second switch. The switching circuit is in a pre-charging state when the second path is activated and the first path is deactivated. The switching circuit is in an operational state when the second path is deactivated and the first path is activated. The power controller also includes a circuit sensor that is configured to provide signals that are indicative of a state-of-charge (SOC) of the load. The power controller also includes a processing unit that is configured to open or close the first and second switches to change the switching circuit between the pre-charging state and the operational state. The processing unit is configured to determine the SOC of the load based on the signals from the circuit sensor and determine whether to pre-charge the load based on the SOC. The processing unit operates the switching circuit in the operational state when the processing unit determines to not pre-charge the load. The processing unit operates the switching circuit in the pre-charging state for a time period that is based on the SOC when the processing unit determines to pre-charge the load.

In one aspect, the circuit sensor includes at least one sensor that is configured to detect at least one of (a) a current through the first or second path, (b) a voltage across the first or second path, or (c) a voltage across the load.

In another aspect, upon receiving a command to stop providing electrical power, the processing unit may activate the second path while the first path is activated and deactivate the first path after activating the second path. The processing unit may open the second switch after a time delay to reduce voltage kickback.

In another aspect, the processing unit may operate the switching circuit in the pre-charging state when a load characteristic is greater than a reference value and operate the switching circuit in the operational state when the load characteristic is less than the reference value. The load characteristic may be the SOC or the load voltage and the reference value may be a reference charge or a reference voltage, respectively. Optionally, the processing unit is configured to determine the reference value. The reference value may be based on a temperature detected along the second path. Optionally, the processing unit does not allow the second path to be activated when the temperature along the second path exceeds or is predicted to exceed a designated temperature value.

In another aspect, the processing unit may activate the first path instead of the second path when the second path exceeds or is predicted to exceed a designated temperature value.

In another aspect, the processing unit is configured to determine the SOC prior to activation of the power controller.

In another aspect, the processing unit is configured to receive a number of capacitance values at different points during a lifetime operation of the load. The processing unit may be configured to analyze the capacitance values to determine a health status of the load. Optionally, the processing unit is configured to report the health status of the load.

In an embodiment, a power controller is provided that includes a switching circuit configured to provide electrical power to a load. The switching circuit includes a first path having a first switch and a second path that is in parallel with the first path prior to the load. The second path includes a second switch. The switching circuit is in a pre-charging state when the second path is activated and the first path is deactivated. The switching circuit is in an operational state when the second path is deactivated and the first path is activated. The power controller also includes a processing unit that is configured to open or close the first and second switches to change the switching circuit between the pre-charging state and the operational state. Upon receiving a command to stop providing electrical power, the processing unit activates the second path while the first path is activated and deactivates the first path after activating the second path. The processing unit opens the second switch of the second path after a time delay to reduce a voltage kickback.

In one aspect, the time delay is at a local minimum of the current after the first switch is opened or within 10 microseconds of the local minimum.

In another aspect, the power controller includes a circuit sensor that is configured to provide signals that are indicative of a source or load current. The time delay is based on the source or load current after the first path is deactivated.

In another aspect, the processing unit is configured to at least one of (a) determine whether the load is an inductive load or (b) receive instructions that determine whether the load is an inductive load.

In another aspect, the power controller includes a circuit sensor that is configured to provide signals that are indicative of a state-of-charge (SOC) of the load. The processing unit is configured to determine the SOC of the load based on the signals from the circuit sensor and determine whether to pre-charge the load based on the SOC. The processing unit may operate the switching circuit in the operational state when the processing unit determines to not pre-charge the load. The processing unit may operate the switching circuit in the pre-charging state for a time period that is based on the SOC when the processing unit determines to pre-charge the load.

In an embodiment, a power controller is provided that includes a switching circuit configured to provide electrical power to a load. The switching circuit includes a first path having a first switch and a second path that is in parallel with the first path prior to the load. The second path includes a second switch. The switching circuit is in a pre-charging state when the second path is activated and the first path is deactivated. The switching circuit is in an operational state when the second path is deactivated and the first path is activated. The power controller also includes a circuit sensor that is configured to provide signals that are indicative of a capacitance of the load. The power controller also includes a storage medium that is configured to store capacitance values of the load at different points during a lifetime of the load. The power controller also includes a processing unit that is configured to open or close the first and second switches to change the switching circuit between the pre-charging state and the operational state. The processing unit is configured to determine the capacitance values of the load based on the signals from the circuit sensor and store the capacitance values in the storage medium. The processing unit is configured to analyze the capacitance values to determine a health status of the load.

In one aspect, the processing unit is configured to report the health status of the load.

In another aspect, the circuit sensor is configured to provide signals that are indicative of a state-of-charge (SOC) of the load. The processing unit is configured to determine the SOC of the load based on the signals from the circuit sensor and determine whether to pre-charge the load based on the SOC. The processing unit may operate the switching circuit in the operational state when the processing unit determines to not pre-charge the load. The processing unit may operate the switching circuit in the pre-charging state for a time period that is based on the SOC when the processing unit determines to pre-charge the load.

In one aspect, the circuit sensor includes at least one sensor that is configured to detect at least one of (a) a current through the second path, (b) a voltage across the second path, or (c) a voltage across the load.

In another aspect, upon receiving a command to stop providing electrical power, the processing unit may activate the second path while the first path is activated and deactivate the first path after activating the second path. The processing unit opens the second switch after a time delay to reduce voltage kickback.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A power controller comprising:
    a switching circuit configured to provide electrical power to a load, the switching circuit including a first path having a first switch and a second path that is in parallel with the first path prior to the load, the second path including a second switch, the switching circuit being in a pre-charging state when the second path is activated and the first path is deactivated, the switching circuit being in an operational state when the second path is deactivated and the first path is activated;
    a circuit sensor configured to provide signals that are indicative of a state-of-charge (SOC) of the load; and
    a processing unit configured to open or close the first and second switches to change the switching circuit between the pre-charging state and the operational state, wherein the processing unit is configured to determine the SOC of the load based on the signals from the circuit sensor and determine whether to pre-charge the load based on the SOC, wherein:
        the processing unit operates the switching circuit in the operational state when the processing unit determines to not pre-charge the load; and
        the processing unit operates the switching circuit in the pre-charging state for a time period that is based on the SOC when the processing unit determines to pre-charge the load.

2. The power controller of claim 1, wherein the circuit sensor includes at least one sensor that is configured to detect at least one of (a) a current through the first or second path, (b) a voltage across the first or second path, or (c) a voltage across the load.

3. The power controller of claim 1, wherein, upon receiving a command to stop providing electrical power, the processing unit activates the second path while the first path is activated and deactivates the first path after activating the second path, the processing unit opening the second switch after a time delay to reduce voltage kickback.

4. The power controller of claim 1, wherein the processing unit operates the switching circuit in the pre-charging state when a load characteristic is greater than a reference value and operates the switching circuit in the operational state when the load characteristic is less than the reference value, wherein the load characteristic is the SOC or a load voltage and the reference value is a reference charge or a reference voltage, respectively.

5. The power controller of claim 4, wherein the processing unit is configured to determine the reference value, the reference value being based on a temperature detected along the second path.

6. The power controller of claim 5, wherein the processing unit does not allow the second path to be activated when the temperature along the second path exceeds or is predicted to exceed a designated temperature value.

7. The power controller of claim 1, wherein the processing unit activates the first path instead of the second path when the second path exceeds or is predicted to exceed a designated temperature value.

8. The power controller of claim 1, wherein the processing unit is configured to determine the SOC prior to activation of the power controller.

9. The power controller of claim 1, wherein the processing unit is configured to receive a number of capacitance values at different points during a lifetime operation of the load, the processing unit configured to analyze the capacitance values to determine a health status of the load.

10. The power controller of claim 9, wherein the processing unit is configured to report the health status of the load.

11. The power controller of claim 1, wherein the processing unit is at least one of:
a hard-wired device that performs the operations to pre-charge the load based on the SOC based on hard-wired logic; or
one or more processors programmed or instructed to perform the operations.

12. A power controller comprising:
a switching circuit configured to provide electrical power to a load, the switching circuit including a first path having a first switch and a second path that is in parallel with the first path prior to the load, the second path including a second switch, the switching circuit being in a pre-charging state when the second path is activated and the first path is deactivated, the switching circuit being in an operational state when the second path is deactivated and the first path is activated;
a processing unit configured to open or close the first and second switches to change the switching circuit between the pre-charging state and the operational state;
wherein, upon receiving a command to stop providing electrical power, the processing unit activates the second path while the first path is activated and deactivates the first path after activating the second path, the processing unit opening the second switch of the second path after a time delay to reduce a voltage kickback.

13. The power controller of claim 12, wherein the time delay is at a local minimum of the current after the first switch is opened or within 10 microseconds of the local minimum.

14. The power controller of claim 12, further comprising a circuit sensor that is configured to provide signals that are indicative of a source or load current, the time delay being based on the source or load current after the first path is deactivated.

15. The power controller of claim 12, wherein the processing unit is configured to at least one of (a) determine whether the load is an inductive load or (b) receive instructions that determine whether the load is an inductive load.

16. The power controller of claim 12, further comprising a circuit sensor configured to provide signals that are indicative of a state-of-charge (SOC) of the load, wherein the processing unit is configured to determine the SOC of the load based on the signals from the circuit sensor and determine whether to pre-charge the load based on the SOC, wherein:
the processing unit operates the switching circuit in the operational state when the processing unit determines to not pre-charge the load; and
the processing unit operates the switching circuit in the pre-charging state for a time period that is based on the SOC when the processing unit determines to pre-charge the load.

17. A power controller comprising:
a switching circuit configured to provide electrical power to a load, the switching circuit including a first path having a first switch and a second path that is in parallel with the first path prior to the load, the second path including a second switch, the switching circuit being in a pre-charging state when the second path is activated and the first path is deactivated, the switching circuit being in an operational state when the second path is deactivated and the first path is activated;
a circuit sensor configured to provide signals that are indicative of a capacitance of the load;
a storage medium configured to store capacitance values of the load at different points during a lifetime of the load; and
a processing unit configured to open or close the first and second switches to change the switching circuit between the pre-charging state and the operational state, wherein the processing unit is configured to determine the capacitance values of the load based on the signals from the circuit sensor and store the capacitance values in the storage medium, the processing unit being configured to analyze the capacitance values to determine a health status of the load.

18. The power controller of claim 17, wherein the processing unit is configured to report the health status of the load.

19. The power controller of claim 17, wherein the circuit sensor is configured to provide signals that are indicative of a state-of-charge (SOC) of the load, wherein the processing unit is configured to determine the SOC of the load based on the signals from the circuit sensor and determine whether to pre-charge the load based on the SOC, wherein:
the processing unit operates the switching circuit in the operational state when the processing unit determines to not pre-charge the load; and
the processing unit operates the switching circuit in the pre-charging state for a time period that is based on the SOC when the processing unit determines to pre-charge the load.

20. The power controller of claim 17, wherein the circuit sensor includes at least one sensor that is configured to detect at least one of (a) a current through the second path, (b) a voltage across the second path, or (c) a voltage across the load.

* * * * *